US010197018B2

(12) United States Patent
Talwar et al.

(10) Patent No.: US 10,197,018 B2
(45) Date of Patent: Feb. 5, 2019

(54) EXHAUST GAS RECIRCULATION AND CONTROL WITH TWIN SCROLL TURBINES

(71) Applicant: Cummins Inc., Columbus, IN (US)

(72) Inventors: Sudhanshu Talwar, Columbus, IN (US); Samuel C. Geckler, Columbus, IN (US); Marten H. Dane, Columbus, IN (US)

(73) Assignee: Cummins Inc., Columbus, IN (US)

( * ) Notice: Subject to any disclaimer, the term of this patent is extended or adjusted under 35 U.S.C. 154(b) by 327 days.

(21) Appl. No.: 14/993,410

(22) Filed: Jan. 12, 2016

(65) Prior Publication Data
US 2016/0123281 A1 May 5, 2016

Related U.S. Application Data

(62) Division of application No. 13/917,189, filed on Jun. 13, 2013, now Pat. No. 9,249,761.

(51) Int. Cl.
*F02M 26/43* (2016.01)
*F02M 26/42* (2016.01)
*F02M 26/05* (2016.01)

(52) U.S. Cl.
CPC ............ *F02M 26/43* (2016.02); *F02M 26/05* (2016.02); *F02M 26/42* (2016.02)

(58) Field of Classification Search
CPC . F02M 25/0706; F02M 25/0707; F02M 26/43
See application file for complete search history.

(56) References Cited

U.S. PATENT DOCUMENTS

| | | | |
|---|---|---|---|
| 4,179,892 | A | 12/1979 | Heydrich |
| 4,294,073 | A | 10/1981 | Neff |
| 5,617,726 | A | 4/1997 | Sheridan et al. |
| 6,286,489 | B1 | 9/2001 | Bailey |
| 6,324,847 | B1 | 12/2001 | Pierpont |
| 7,287,378 | B2 | 10/2007 | Chen et al. |
| 7,721,541 | B2 | 5/2010 | Roberts, Jr. et al. |
| 8,935,917 | B2 | 1/2015 | Hayman et al. |
| 2001/0035171 | A1 | 11/2001 | Kim et al. |
| 2003/0115875 | A1 | 6/2003 | Sumser et al. |
| 2004/0074480 | A1 | 4/2004 | Chen et al. |

(Continued)

FOREIGN PATENT DOCUMENTS

| | | |
|---|---|---|
| EP | 1493907 | 2/2007 |
| GB | 2458968 | 10/2009 |

(Continued)

OTHER PUBLICATIONS

International Search Report and Written Opinion, ISA/US Appln. No. PCT/US14/42070, dated Oct. 10, 2014, 8 pgs.

*Primary Examiner* — Mary A Davis
(74) *Attorney, Agent, or Firm* — Taft Stettinius & Hollister LLP

(57) ABSTRACT

Systems and methods for internal combustion engine operation with exhaust gas recirculation and turbocharging are disclosed. The systems include an exhaust gas recirculation loop for recirculating exhaust gas flow from a first portion of the cylinders of the engine into an intake system prior to combustion. The system further includes a turbine with first and second inlets for receiving exhaust gas flows from respective first and second parts of the exhaust gas of the remaining portion of the cylinders.

15 Claims, 4 Drawing Sheets

(56) References Cited

U.S. PATENT DOCUMENTS

| | | |
|---|---|---|
| 2009/0308070 A1 | 12/2009 | Alger, II et al. |
| 2011/0088391 A1 | 4/2011 | Sumser |
| 2012/0048244 A1 | 3/2012 | Hayman et al. |
| 2013/0000300 A1 | 1/2013 | O'Hara |
| 2013/0000614 A1 | 1/2013 | Freund et al. |
| 2014/0223903 A1 | 8/2014 | Keating |
| 2015/0315961 A1* | 11/2015 | Uhlenhake ............ F02B 37/12 60/602 |

FOREIGN PATENT DOCUMENTS

| | | |
|---|---|---|
| WO | 2011106496 | 9/2011 |
| WO | 2012030816 | 3/2012 |
| WO | 2012039732 | 3/2012 |
| WO | 2015027335 | 3/2015 |

* cited by examiner

6 CYLINDER ENGINE W/2 EGR CYLINDERS

| CYLINDER # | 30a | 30e | 30c | 30f | 30b | 30d |
|---|---|---|---|---|---|---|
| 1st CONFIGURATION | 48a | 40 | 48b | 40 | 48a | 48b |
| 2nd CONFIGURATION | 40 | 48a | 48b | 48a | 40 | 48b |
| 3rd CONFIGURATION | 48a | 48b | 40 | 48b | 48a | 40 |

*Fig. 2A*

6 CYLINDER ENGINE W/1 EGR CYLINDERS

| CYLINDER # | 30a | 30e | 30c | 30f | 30b | 30d |
|---|---|---|---|---|---|---|
| 1st CONFIGURATION | 48a | 48b | 48a | 40 | 48a | 48b |
| 2nd CONFIGURATION | 40 | 48b | 48a | 48b | 48a | 48b |

*Fig. 2B*

6 CYLINDER ENGINE W/OPTIONAL 1 OR 2 EGR CYLINDERS

| CYLINDER # | 30a | 30e | 30c | 30f | 30b | 30d |
|---|---|---|---|---|---|---|
| 1st CONFIGURATION | 48a | 40/48b | 48a | 40 | 48a | 48b |
| 2nd CONFIGURATION | 40 | 48b | 48a | 48b | 40/48a | 48b |

*Fig. 2C*

4 CYLINDER ENGINE W/1 EGR CYLINDER

| CYLINDER # | 1 | 3 | 4 | 2 |
|---|---|---|---|---|
| 1st CONFIGURATION | 40 | 48a | 48b | 48a |
| 2nd CONFIGURATION | 48b | 48a | 40 | 48a |

*Fig. 2D*

| CYLINDER # | 130a | 130d | 130e | 130b | 130c | 130f |
|---|---|---|---|---|---|---|
| CONNECTION CONFIGURATION | 146 | 148 | 138 | 148 | 146 | 138 |

| CYLINDER # | 230a | 230h | 230d | 230c | 230f | 230e | 230g | 230b |
|---|---|---|---|---|---|---|---|---|
| CONNECTION CONFIGURATION | 246 | 238 | 248 | 246 | 248 | 246 | 238 | 248 | ively coupled via electrostatic forces...

EXHAUST GAS RECIRCULATION AND CONTROL WITH TWIN SCROLL TURBINES

CROSS-REFERENCE TO RELATED APPLICATION

The present application is a divisional of U.S. patent application Ser. No. 13/917,189 filed on Jun. 13, 2013, which is incorporated herein by reference in its entirety.

FIELD OF THE INVENTION

The present invention relates generally to exhaust gas recirculation in internal combustion engines, and more particularly is concerned with systems and methods for exhaust gas recirculation from a first portion the cylinders of the engine and the remaining portion of the cylinders providing exhaust flow to a twin scroll turbine.

BACKGROUND

The production of nitrogen oxides ($NO_x$) by internal combustion engines are undesirable and in many cases are controlled by regulations established by governmental entities. Furthermore, spark ignited engines exhibit abnormal combustion phenomena called "knock", which occurs when combustion reactions in the unburned zone initiate rapid uncontrolled combustion prior to the arrival of the propagating flame front of a homogenous combustion process. Various methods have been employed in attempts to address knock, including lowering the end gas temperature such as by lowering the compression ratio, retarding the start of combustion, or providing evaporative cooling through direct injection. Another method involves modifying the octane rating of the fuel, such as by using a higher octane fuel. Yet another method for controlling knock includes increasing the flame propagation rate by, for example, improving the mixture homogeneity or by increasing the turbulence level induced by organized charge motion.

Another technique for knock suppression is exhaust gas recirculation. Such recirculation can occur from one or more exhaust gas recirculation (EGR) cylinders whose exhaust output is dedicated during at least part of the engine operation to continuously provide an EGR flow to the intake. Since the exhaust from such EGR cylinders does not escape the engine during EGR operation, alternate combustion processes in the EGR cylinders, such as a rich combustion operation, can be used to produce favorable species, such as hydrogen, in the exhaust output that is recirculated to the intake for all cylinders.

When the EGR cylinders operate to provide EGR flow and the remaining cylinders provide the exhaust output, the engine acts as a positive displacement pump to drive the EGR flow, reducing pumping losses in transporting exhaust to the intake system and allowing a wide range of engine out nitrous oxide emissions to be achieved. However, there is a pumping mean effective pressure (PMEP) penalty that results from obtaining a proper mix of EGR flow with fresh air flow in the intake in order to reduce cylinder-to-cylinder variation in the recirculated exhaust gas. Thus, problems remain in obtaining a proper mix of the EGR flow with the intake air flow over a wide range of engine operating conditions while achieving distribution of the EGR flow among the engine cylinders. Therefore, systems, methods and devices are needed to improve EGR flow in internal combustion engine systems.

SUMMARY

Embodiments include unique internal combustion engine systems and methods for exhaust gas recirculation during operation of an engine including a plurality of cylinders. The systems and methods include an exhaust gas recirculation system for recirculating exhaust gas flow from a first portion of the plurality of cylinders into an air intake system prior to combustion. The systems and methods further include a turbocharger having first and second inlets for receiving the respective first and second parts of the exhaust output of a second portion of the plurality of cylinders to drive the turbine. Further embodiments, forms, objects, features, advantages, aspects, and benefits shall become apparent from the following description and drawings.

BRIEF DESCRIPTION OF THE DRAWINGS

FIGS. 2A-2D provide diagrams of various cylinder connection arrangements with the turbine and EGR system of FIG. 1.

DESCRIPTION OF ILLUSTRATIVE EMBODIMENTS

Figure 1:
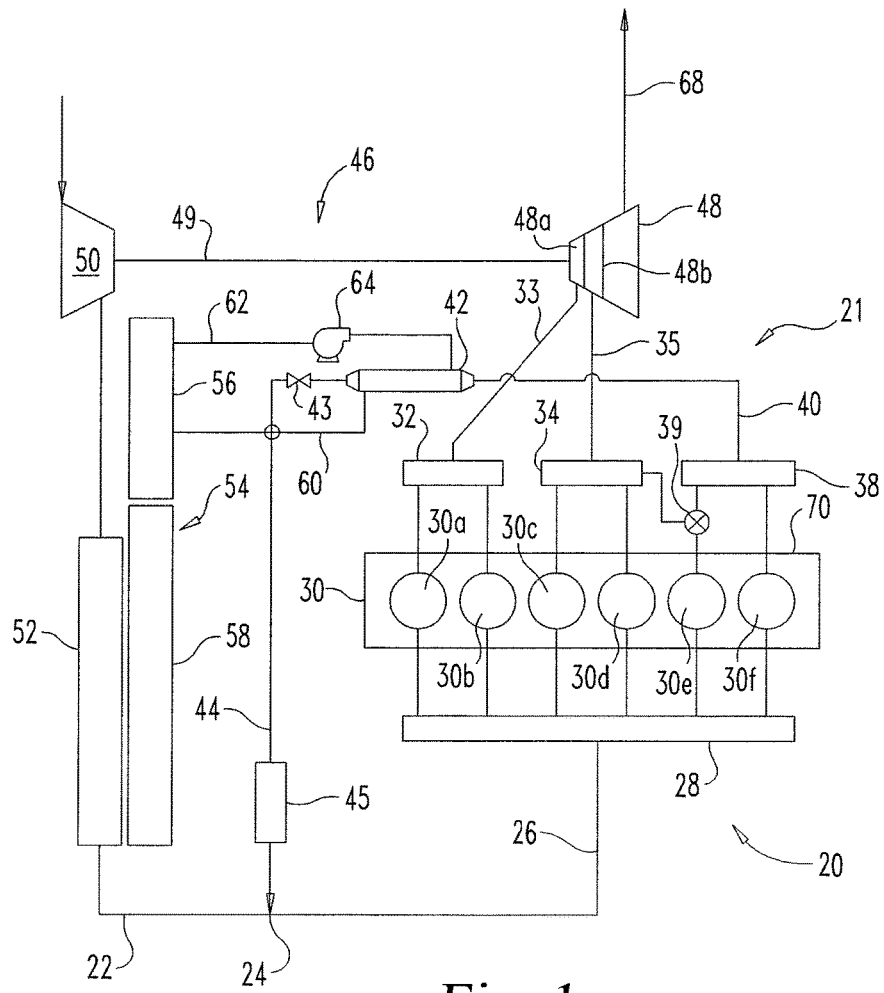
FIG. 1 is a schematic illustration of an internal combustion engine system that is configured to provide EGR flow from a first portion of the cylinders of the engine and to provide an exhaust gas flow to a turbocharger from a second portion of the cylinders.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, a system 20 for controlling EGR flow is illustrated in schematic form. System 20 is depicted having an internal combustion engine 30 with an intake system and an exhaust system connected by an EGR system or loop 21. The engine 30 is an internal combustion engine of any type, and can include a stoichiometric engine, a gasoline engine, alcohol engine (e.g. ethanol or methanol), or a natural gas engine. In certain embodiments, the engine 30 includes a lean combustion engine such as a lean burn gasoline engine, lean burn alcohol engine, lean burn natural gas engine, or a diesel cycle engine. In certain embodiments, the engine 30 may be any engine type producing emissions that may be used in an exhaust gas recirculation (EGR) system to, for example to reduce knock and $NO_x$ emissions from the engine 30. In the illustrated embodiment, the engine 30 includes six cylinders 30a-30f in an in-line arrangement. However, the number of cylinders may be any number, and the arrangement of cylinders may be any arrangement, and is not limited to the number and arrangement shown in FIG. 1.

The engine 30 includes a first portion of the cylinders 30a-30f, illustrated as EGR cylinders 30e and 30f in FIG. 1, that provide EGR flow to EGR system 21, and a second portion of the plurality of cylinders 30a-30f, illustrated as exhaust outlet cylinders 30a-30d in FIG. 1, that provide exhaust gas flow to exhaust outlet 68. While two EGR cylinders 30e, 30f are shown in FIG. 1, only one or more than two EGR cylinders are also contemplated. Also, the number of cylinders 30a-30d providing one or more parts or portions of the second portion of the exhaust gas flow may include one, two, three or more than four cylinders.

As used herein, the term EGR cylinder should be read broadly unless otherwise indicated. Any arrangement wherein, during at least certain operating conditions, the entire exhaust output of the cylinder(s) is recirculated to the engine intake is an EGR cylinder. In one particular embodiment, the EGR cylinder or cylinders are dedicated such that the exhaust output therefrom is exclusively provided as EGR flow. However, other embodiments contemplate that under certain operating conditions the EGR cylinder or cylinders can provide exhaust output to exhaust outlet 68.

As used herein, the term exhaust outlet cylinder should be read broadly unless otherwise indicated. Any arrangement wherein, during at least certain operating conditions, the entire exhaust output of the cylinder(s) is outlet to exhaust outlet 68 is an exhaust outlet cylinder. In one particular embodiment, the exhaust outlet cylinder or cylinders are dedicated such that the exhaust output therefrom is exclusively provided as to exhaust outlet 68. However, other embodiments contemplate that under certain operating conditions the exhaust outlet cylinder or cylinders can provide exhaust output for exhaust gas recirculation.

In the system 20, the exhaust gas from the EGR cylinders 30e, 30f recirculates and combines with intake gases at a position upstream of an intake manifold 28 of engine 30.

The recirculated exhaust gas may combine with the intake gases at a mixer 45 at or adjacent mixing location 24 or by any other arrangement. In certain embodiments, the recirculated exhaust gas returns to the intake manifold 28 directly. The EGR system 21 of FIG. 1 may be a high-pressure loop or system, for example, by returning the exhaust of the EGR cylinder(s) 30e, 30f to the intake system at a position downstream of a compressor 50 as shown.

Engine 30 includes an engine block 70 that at least partially defines the cylinders 30a-30f. A piston (not shown) may be slidably disposed within each cylinder 30a-30f to reciprocate between a top-dead-center position and a bottom-dead-center position, and a cylinder head (not shown) may be associated with each cylinder 30a-30f. Each of the cylinders 30a-30f, its respective piston, and the cylinder head form a combustion chamber. In the illustrated embodiment, engine 30 includes six such combustion chambers.

However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 30a-30f moves through an intake stroke, a compression stroke, a combustion or power stroke, and an exhaust stroke. Thus, during each complete cycle for the depicted six cylinder engine, there are six strokes during which air is drawn into individual combustion chambers from intake manifold supply conduit 26. In the illustrated embodiment, during four strokes exhaust is expelled from individual cylinders 30a-30d to exhaust outlet 68, and during two exhaust strokes exhaust gas is expelled from cylinders 30e, 30f to a recirculating exhaust gas supply conduit 40 to provide an EGR fraction of about 33%. These strokes correspond with pulsations of air and exhaust within the respective systems. It should be understood that other dedicated EGR fractions are contemplated. For example, an arrangement with one EGR cylinder provides an EGR fraction of 16%, and a four cylinder engine with a single EGR cylinder provides an EGR fraction of 25%.

The intake of system 20 includes an inlet supply conduit 22, a mixing location 24 to receive EGR flow, an intake manifold supply conduit 26, and an engine intake manifold 28 connected to engine 30. System 20 also includes an exhaust system coupled to engine 30 that includes a first exhaust manifold 32 to receive exhaust output from cylinders 30a, 30b that is connected to and in flow communication with a first exhaust conduit 33. The exhaust system also includes a second exhaust manifold 34 separate from first exhaust manifold 32 that receives exhaust output from cylinders 30c, 30d. Second exhaust manifold 34 is connected to and in flow communication with a second exhaust conduit 35. The exhaust system further includes a turbocharger 46 with a turbine 48 having a housing with a twin scroll configuration defining first and second inlets. The first scroll of turbine 48 includes an inlet 48a connected to and in flow communication with first exhaust conduit 33 and a second scroll that includes a second inlet 48b connected to and in flow communication with second exhaust conduit 35. An aftertreatment system (not shown) downstream of turbocharger 46 can be provided for removing one or more pollutants from the exhaust gas stream before passing the treated exhaust stream out of exhaust outlet 68.

EGR system 21 includes a third exhaust manifold 38 to collect exhaust output from EGR cylinders 30e, 30f that is separate from first exhaust manifold 32 and second exhaust manifold 34. Recirculating exhaust gas supply conduit 40 extends from and is in flow communication with third exhaust manifold 38. The EGR system 21 may also include an EGR cooler 42 and an EGR flow valve 43 that allows the flow of exhaust from the EGR cylinders 30e, 30f to EGR cooler 42 to be varied. In certain embodiments EGR flow valve 43 is omitted. EGR flow in EGR system 21 continues from EGR cooler 42 through an EGR conduit 44 to mixer 45 at or adjacent mixing location 24 where EGR flow is mixed with intake flow from inlet supply conduit 22. EGR conduit 44 is flow coupled to mixing location 24 and the inlet supply conduit 22 is flow coupled to mixing location 24 to create a charge flow that includes combined inlet flow and recirculated exhaust gas from EGR system 21. The charge flow created at mixing location 24 is flow coupled to engine intake manifold 28 through intake manifold supply conduit 26.

EGR cooler 42 may further be connected to a radiator system 54 including a low temperature radiator 56 and a high temperature radiator 58. A coolant return line 60 extends from EGR cooler 42 to radiator system 54 and a coolant supply line 62 supplies coolant from radiator system 54 to EGR cooler 42. Coolant supply line 62 may include a pump 64 to provide circulation of coolant flow. In another embodiment, the coolant system may utilize only one radiator, such as radiator 58. In still other embodiments, EGR system 21 includes a bypass and a control valve to selectively bypass all or a portion of the dedicated EGR flow around EGR cooler 42.

In one embodiment, exhaust conduits 33, 35 are flowed coupled to respective ones of exhaust manifolds 32, 34 and may also include one or more intermediate flow passages, conduits or other structures. Exhaust conduits 33, 35 extend to respective ones of first and second scrolls of turbine 48 of turbocharger 46. Turbocharger 46 may be any suitable turbocharger known in the art, including variable-geometry turbine turbochargers and waste-gated turbochargers. In another non-illustrated embodiment, turbocharger 46 may also include multiple turbochargers, with exhaust conduits 33, 35 connected to respective ones of the turbochargers. In FIG. 1, turbine 48 is connected via a shaft 49 to compressor 50, and compressor 50 is flow coupled to inlet supply conduit 22. Inlet supply conduit 22 may include a charge air cooler 52 downstream from compressor 50 and upstream from mixing location 24. In another embodiment, a charge air cooler 52 is located in the intake system downstream from mixing location 24.

The components illustrated in FIG. 1 are not exclusive of all components and/or arrangements that may be included in system 20. Furthermore, one or more of the illustrated components in system 20 may be omitted. For example, in one embodiment, a low pressure EGR system is provided to connect the exhaust downstream of turbine 48 to the intake upstream of compressor 50. Furthermore, one or more controllers may be provided to control operation of any one or more components of system 20.

In operation of system 20, fresh air is supplied through inlet air supply conduit 22. The fresh air flow can be filtered, unfiltered, and/or conditioned in any known manner, either before or after mixing with the EGR flow from EGR system 21. The intake system may include components configured to facilitate or control introduction of the combined flow to engine 30, and may include an induction valve or throttle (not shown), one or more compressors 50, and charge air cooler 52. The induction valve may be connected upstream or downstream of compressor 50 via a fluid passage and configured to regulate a flow of atmospheric air and/or combined flow to engine 30. Compressor 50 may be a fixed or variable geometry compressor configured to receive air or combined flow from the induction valve and compress the air or combined flow to a predetermined pressure level upstream of intake manifold 28. Charge air cooler 52 may be disposed within inlet air supply conduit 22 between engine 30 and compressor 50, and embody, for example, an air-to-air heat exchanger, an air-to-liquid heat exchanger, or a combination of both to facilitate the transfer of thermal energy to or from the flow directed to engine 30.

In one embodiment, ambient air and/or combined flow is pressurized with compressor 50 and sent through charge air cooler 52 before delivery to mixing location 24. Control valve 43 is operable to proportionally control a recirculation of all or a portion of exhaust gas from EGR cylinders 30e-30f through EGR system 21 to mixing location 24. EGR flow valve 43 may be actuatable to control the proportion of exhaust gas that is recirculated from dedicated cylinders 30e, 30f or may simply be an on/off type valve with proportion control provided exclusively by other means. In embodiments in which only a portion of exhaust gas is recirculated from dedicated cylinders 30e, 30f, an EGR flow measurement sensor or intake oxygen measurement sensor may be provided to estimate the amount of EGR flow that is inducted into cylinders 30a-30f. In still other embodiments, there is no EGR valve 43 and dedicated EGR flow is provided continuously during engine operation. The EGR flow from EGR system 21 is distributed and mixed with inlet air received from inlet air supply conduit 22 at mixing location 24. The air-exhaust gas mixture is then supplied to engine 30 through intake manifold supply conduit 26 to engine intake manifold 28.

The engine 30 is fluidly coupled to intake manifold 28 and exhaust manifold 32, and the EGR stream passes from the one or more dedicated cylinder(s) 30e, 30f through third exhaust manifold 38. Exhaust gas which is not recirculated, such as the exhaust gas from cylinders 30a-30d, continues through turbine 48 to an exhaust outlet 68, which may include an aftertreatment system (not shown) upstream of a tail pipe or other structure that releases the exhaust gas to the atmosphere. The exhaust system along exhaust outlet 68 may include components configured to treat exhaust from engine 30 before release to the atmosphere. Specifically, the exhaust system may include, for example, oxidation devices (DOC), particulate removing devices (DPF, CDPF), constituent absorbers or reducers (SCR, AMOX, LNT), three-way catalysts for stoichiometric spark ignited engines, attenuation devices (mufflers), controllers, etc., if desired.

In operation, engine 30 produces an exhaust gas stream from cylinders 30a, 30b into exhaust conduit 33, an exhaust stream from cylinders 30c, 30d into exhaust conduit 35, and an exhaust stream from EGR cylinders 30e, 30f into EGR system 21, and receives a charge flow from intake manifold supply conduit 26 comprising intake air and, in situations in which exhaust gas is recirculated, recirculated exhaust gas from one EGR system 21 and/or any low pressure EGR system. In one embodiment, all or a portion of the exhaust output from cylinder 30e can be selectively routed to either EGR conduit 40 through third manifold 38 or to second inlet 48b through second manifold 34 via a two way control valve 39. The control valve 39 allows the fraction of EGR flow to be varied, for example, between about 16% and 33%.

Turbine 48 may include a twin scroll configuration with a first volute or scroll 48a and a second volute or scroll 48b, where each scroll 48a, 48b receives a separate flow of exhaust gas from respective ones of the exhaust conduits 33, 35. Examples of twin scroll turbochargers with symmetric and asymmetric scrolls are contemplated, such as shown, for example, in U.S. Pat. No. 4,179,892, which is incorporated herein by reference in its entirety for all purposes. As used herein, a symmetric configuration is one in which the cross-sectional areas of the flow passages of the twin scrolls is the same, and an asymmetric configuration is one in which the cross-sectional area of one of the flow passages is greater than the other.

In six cylinder engine configurations such as shown in FIG. 1, the cylinders fire in a predetermined order defined by cylinder 30a, then cylinder 30e, then cylinder 30c, then cylinder 30f, then cylinder 30b, and then cylinder 30d at a phase difference of 120 degrees between each consecutive cylinder in the firing order. In the illustrated embodiment of FIG. 1, the exhaust output of cylinders 30a-30d is directed to turbine 48, and the exhaust output of cylinders 30e, 30f is directed to EGR conduit 40. In systems in which consecutive cylinders in the firing order output exhaust in a common manifold, the downstream cylinder in the firing order works against a higher exhaust pressure created the cylinder(s) fired immediately before the downstream cylinder.

System 20 provides an arrangement in which the exhaust pulses of the cylinders 30a, 30b connected to first manifold 32 are separated by the firing of at least one other cylinder 30c-30f so that the obstructive interference of the exhaust pulses of cylinders 30a, 30b into manifold 32 is reduced, improving PMEP of engine 30. In addition, the exhaust pulses of the cylinders 30c, 30d connected to second manifold 34 are also separated by the firing of at least one other cylinder so that the obstructive interference of the exhaust pulses of cylinders 30c, 30d into manifold 34 is reduced, and the exhaust pulses of cylinders 30e, 30f into third exhaust manifold 38 are also separated by the firing of at least one cylinder. Since third exhaust manifold 38 and EGR conduit 40 are fluidly isolated from first and second exhaust manifolds 32, 34 and first and second exhaust conduits 33, 35, and since first exhaust manifold 32 and first exhaust conduit 33 are fluidly isolated from second exhaust manifold 34 and second exhaust conduit 35, the exhaust pulses from consecutively fired cylinders are fluidly isolated from one another.

The configuration for system 20 disclosed herein allows the exhaust pressure in the respective manifolds 32, 34 and 38 to be low when the respective cylinders connected thereto are fired since the exhaust pulse is not required to work against an exhaust pulse of an immediately precedingly fired cylinder. This arrangement improves PMEP of engine 30 and the balance of cylinders 30a-30d. In addition, cylinders 30a-30d initiate exhaust output when the exhaust pressure in the respective manifold 32, 34 is lower than the pressure of intake manifold 28, improving the internal residuals of cylinders 30a-30d. Furthermore, the blow-down of the exhaust output of each cylinder 30a-30d can be maintained to the respective turbine inlet before the commonly connected cylinder initiates exhaust output, improving turbine efficiency.

Referring now to FIGS. 2A-2D, there are shown various examples of connection arrangements of cylinders 30a-30f with first inlet 48a of turbine 48, second inlet 48b of turbine 48, and EGR conduit 40. In each of these arrangements, cylinders that are physically adjacent one another in engine 30 are commonly connected to one of manifolds 32, 34, 38 which simplifies the plumbing arrangement of the exhaust manifolds and conduits while avoiding connection of adjacent cylinders in the firing order to a common manifold. In FIG. 2A, a six cylinder engine 30 with two EGR cylinders is depicted with three possible configurations for the cylinder connections to turbine 48 and exhaust conduit 40. In the first configuration, which is also shown in FIG. 1, cylinders 30a and 30b are commonly connected to first inlet 48a through first manifold 32, cylinders 30c, 30d are commonly connected to second inlet 48b through second manifold 34, and cylinders 30e, 30f are commonly connected to EGR conduit 40 through third manifold 38.

In the second configuration of FIG. 2A, cylinders 30a and 30b are commonly connected to EGR conduit 40 through first manifold 32, cylinders 30c, 30d are commonly connected to second inlet 48b through second manifold 34, and cylinders 30e, 30f are commonly connected to first inlet 48a through third manifold 38. In the third configuration of FIG. 2A, cylinders 30a and 30b are commonly connected to first inlet 48a through first manifold 32, cylinders 30c, 30d are commonly connected to EGR conduit 40 through second manifold 34, and cylinders 30e, 30f are commonly connected to second inlet 48b through third manifold 38.

Figure 3:
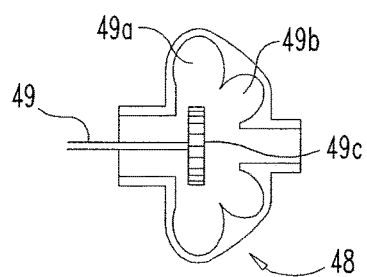
FIG. 3 is a diagrammatic sectional view of one embodiment of a turbine of the turbocharger of FIG. 1.

In FIG. 2B, a six cylinder engine 30 with one EGR cylinder is depicted with two possible configurations for the cylinder connections to turbine 48 and exhaust conduit 40. In the first configuration, cylinders 30a, 30b and 30c are commonly connected to first inlet 48a through first manifold 32, cylinders 30d, 30e are commonly connected to second inlet 48b through second manifold 34, and cylinder 30f is connected to EGR conduit 40 through third manifold 38. In the second configuration of FIG. 2B, cylinder 30a is connected to EGR conduit 40 through first exhaust manifold 32, cylinders 30b, 30c are commonly connected to first inlet 48a through second manifold 34, and cylinders 30d, 30e, 30f are commonly connected to second inlet 48b through third manifold 38. In this arrangement, such as where first exhaust manifold 32 includes a greater number of cylinders connected thereto than second exhaust manifold 34, turbine 48 can include a housing with asymmetric flow passages connected to inlets 48a, 48b such as shown in FIG. 3. The asymmetric arrangement of the flow passages allows the cross-section area of the flow passage 49a connected to inlet 48a to be greater than the cross-sectional area of the flow passage 49b connected to inlet 48b to accommodate higher exhaust flows to turbine wheel 49c.

In FIG. 2C, a six cylinder engine 30 with an option for one or two EGR cylinders is depicted with two possible configurations for the cylinder connections to turbine 48 and exhaust conduit 40. In this configuration, the optional EGR cylinder can be selectively connected to one of the exhaust manifolds 32, 34 for exhaust flow to turbine 48 or to third exhaust manifold 38 for exhaust flow to EGR conduit 40, such as by control of valve 39 shown in FIG. 1, to provide a selectable EGR fraction.

In the first configuration, cylinders 30a, 30b and 30c are commonly connected to first inlet 48a through first manifold 32, and cylinders 30d, 30e are commonly connected to second inlet 48b through second manifold 34. In addition, cylinders 30e, 30f are commonly connected to EGR conduit 40 through third manifold 38. As discussed above, cylinder 30e is selectable for operation to provide exhaust output to turbine inlet 48b or EGR conduit 40 depending on the fraction of EGR flow that is desired. In the second configuration of FIG. 2C, cylinders 30d, 30e and 30f are commonly connected to second inlet 48b through second manifold 34, and cylinders 30b, 30c are commonly connected to first inlet 48a through first manifold 32. In addition, cylinders 30a, 30b are commonly connected to EGR conduit 40 through third manifold 38. As discussed above, cylinder 30b is selectable for operation to provide exhaust output to turbine inlet 48a or EGR conduit 40 depending on the fraction of EGR flow that is desired. Also, turbine 48 can include asymmetric flow passages connected to inlets 48a, 48b such that the cross-section area of the flow passage 49b connected to inlet 48b is greater than the cross-sectional area of the flow passage 49a connected to inlet 48a to accommodate higher exhaust flows from the greater number of cylinders connected thereto.

In FIG. 2D, a four cylinder engine diagram is provided with cylinders 1-4, including one EGR cylinder and two possible configurations for the cylinder connections to turbine 48 and EGR conduit 40. In the first configuration, the first cylinder 1 is connected to EGR conduit 40, cylinders 2 and 3 are connected to first inlet 48a of turbine 48, and cylinder 4 is connected to second inlet 48b of turbine 48. In the second configuration, cylinder 1 is connected to second inlet 48b of turbine 48, cylinders 2 and 3 are connected to first inlet 48a of turbine 48, and EGR cylinder 4 is connected to EGR conduit 40. In either configuration, turbine 48 can include asymmetric flow passages connected to inlets 48a, 48b such that the cross-section area of the flow passage 49a connected to inlet 48a is greater than the cross-sectional area of the flow passage 49b connected to inlet 48b to accommodate higher exhaust flows from the greater number of cylinders connected thereto.

Figures 4A, 4B:
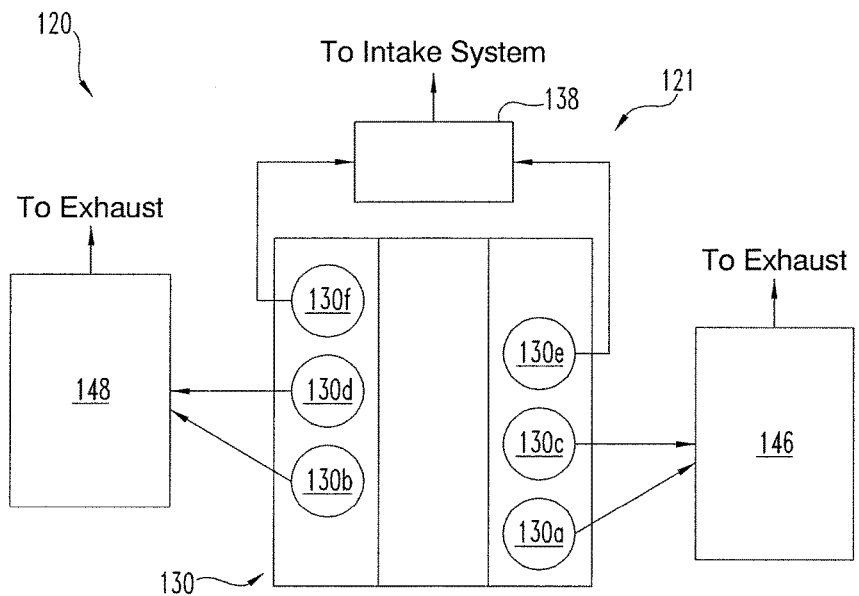
FIG. 4A is a schematic illustration of another embodiment internal combustion engine system that is configured to provide EGR flow from a first portion of the cylinders of the engine, provide an exhaust gas flow to a first turbocharger from a second portion of the cylinders, and provide an exhaust gas flow to a second turbocharger from a third portion of the cylinders.
FIG. 4B is a diagram of one embodiment of a cylinder connection arrangement with the turbines and EGR system of FIG. 4A.

As discussed above, embodiments of engine 30 having a V-configuration are also contemplated. FIG. 4A shows a system 120 that can be configured as discussed above with respect to system 20, but includes an engine 130 having six cylinders 130a, 130b, 130c, 130d, 130e, 130f arranged in a V-configuration and two turbochargers 146, 148. In the illustrated embodiment, cylinders 130a, 130c are connected to first turbocharger 146, cylinders 130b, 130d are connected to second turbocharger 148, and cylinders 130e, 130f are connected to EGR manifold 138. EGR manifold 138 can be connected to the intake system such as discussed above with respect to EGR system 21. First and second turbochargers 146, 148 include turbines that receive the exhaust gas flow to drive a compressor and provide an outlet for the exhaust gas passing therethrough.

In one embodiment, each of first turbocharger 146 and second turbocharger 148 includes a dual scroll turbine arrangement with first and second inlets, such as discussed above with respect to turbine 48. In another embodiment, one or both of first and second turbochargers 146, 148 includes a single inlet and single scroll. In any embodiment, system 120 provides a simplified plumbing connection of the cylinders and separation of exhaust connections so that commonly connected cylinders do not fire consecutively. Referring now to FIG. 4B, a diagram of the cylinder firing order for engine 130 is provided in which cylinder 130a connected to first turbocharger 146 fires first, cylinder 130d connected to second turbocharger 148 fires second, cylinder 130e connected to EGR manifold 138 and thus the EGR conduit fires third, cylinder 130b connected to second turbocharger 148 fires fourth, cylinder 130c connected to first turbocharger 146 fires fifth, and cylinder 130f connected to EGR manifold 138 fires sixth. Other connection arrangements are also contemplated so long as cylinders that are commonly connected to one of turbochargers 146, 148 and EGR manifold 138 do not fire consecutively.

Figures 5A, 5B:
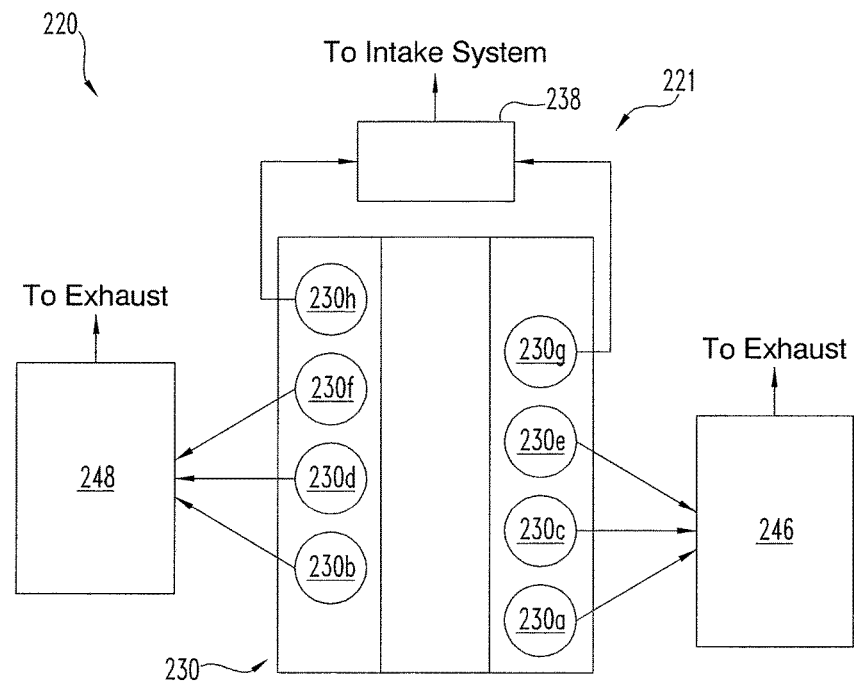
FIG. 5A is a schematic illustration of another embodiment internal combustion engine system that is configured to provide EGR flow from a first portion of the cylinders of the engine, provide an exhaust gas flow to a first turbocharger from a second portion of the cylinders, and provide an exhaust gas flow to a second turbocharger from a third portion of the cylinders.
FIG. 5B is a diagram of one embodiment of a cylinder connection arrangement with the turbines and EGR system of FIG. 5A.

FIG. 5A shows a system 220 that can be configured as discussed above with respect to systems 20, 120, but includes an engine 230 having eight cylinders 230a, 230b, 230c, 230d, 230e, 230f, 230g, 230h arranged in a V-configuration and two turbochargers 246, 248. In the illustrated embodiment, cylinders 230a, 230c, 230e are connected to first turbocharger 246, cylinders 230b, 230d, 230f are connected to second turbocharger 248, and cylinders 230g, 230h are connected to EGR manifold 238. EGR manifold 238 can be connected to the intake system such as discussed above with respect to EGR system 21. First and second turbochargers 246, 248 include turbines that receive the exhaust gas flow to drive a compressor and provide an outlet for the exhaust gas passing therethrough. Turbochargers 246, 248 can include a single scroll, a twin scroll, and/or an asymmetric twin scroll arrangement as discussed above.

System 220 provides a simplified plumbing connection of the cylinders and separation of exhaust connections so that commonly connected cylinders do not fire consecutively. Referring now to FIG. 5B, a diagram of the cylinder firing order for engine 230 is provided in which cylinder 230a connected to first turbocharger 146 fires first, cylinder 230h connected to EGR manifold 238 fires second, cylinder 230d connected to second turbocharger 148 fires third, cylinder 230c connected to first turbocharger 146 fires fourth, cylinder 230f connected to second turbocharger 148 fires fifth, cylinder 230e connected to first turbocharger 246 first sixth, cylinder 230g connected to EGR manifold 238 fires seventh, and cylinder 230b connected to second turbocharger 248 fires eighth. Other connection arrangements are also contemplated so long as cylinders that are commonly connected to one of turbochargers 246, 248 and EGR manifold 238 do not fire consecutively.

In addition, the systems and methods disclosed herein have application in engines with V-configurations that have more than eight cylinders. For example, a twelve cylinder V-shaped engine could be configured with two of the FIG. 4A systems arranged in a back-to-back configuration along a common a shaft. A sixteen cylinder V-shaped engine could be configured with two of the FIG. 5A systems arranged in a back-to-back configuration along a common a shaft. A twenty cylinder V-shaped engine could be arranged with two of the FIG. 4A and one of the FIG. 5A systems arranged back-to-back configuration along a common shaft.

As is evident from the figures and text presented above, a variety of aspects are contemplated. According to one aspect, a system comprises an internal combustion engine including a plurality of cylinders operable to produce an exhaust flow, an exhaust system connected to the plurality of cylinders, an intake system connected to the plurality of cylinders, and a turbocharger. The turbocharger includes a turbine in the exhaust system and a compressor in the intake system connected to the turbine. A first portion of the plurality of cylinders is operably connected to an exhaust gas recirculation system that is connected to the intake system for recirculation of a first portion of the exhaust flow. A second portion of the plurality of cylinders is operably connected to a first inlet to the turbine to provide a second portion of the exhaust flow to the turbine through the first inlet. A third portion of the cylinders is operably connected to a second inlet to the turbine to provide a third portion of the exhaust flow to the turbine through the second inlet.

In one embodiment, the exhaust gas recirculation system is connected to the intake system downstream of the compressor. In another embodiment, the first portion of the plurality of cylinders consists of one cylinder connected to a first exhaust manifold that provides the first portion of the exhaust flow to the exhaust gas recirculation system. In a refinement of this embodiment, each of the cylinders in the second portion of the plurality of cylinders is commonly connected to a second exhaust manifold that provides the second portion of the exhaust flow to the first inlet of the turbine, each of the cylinders of the third portion of the plurality of cylinders is commonly connected to a third exhaust manifold that provides the third portion of the exhaust flow to the second inlet of the turbine, and the plurality of cylinders define a firing order during operation of the internal combustion engine in which commonly connected cylinders do not fire consecutively.

In one embodiment, the first portion of the plurality of cylinders includes first and second cylinders commonly connected to a first exhaust manifold that is connected to the exhaust gas recirculation system. In a refinement of this embodiment, the second portion of the plurality of cylinders includes third and fourth cylinders commonly connected to a second exhaust manifold that is connected to the first inlet of the turbine and the third portion of the plurality of cylinders includes fifth and sixth cylinders that are commonly connected to a third exhaust manifold that is connected to the second inlet of the turbine. In a further refinement, during operation of the engine the plurality of cylinders fire in order from the first cylinder, to the fifth cylinder, to the third cylinder, to the sixth cylinder, to the second cylinder, and then to fourth cylinder so that cylinders commonly connected to respective ones of the first, second and third exhaust manifolds do not fire consecutively.

In another embodiment, during operation of the engine the plurality of cylinders define a firing order and no two consecutive cylinders in the firing order are commonly connected to any of the exhaust gas recirculation system, the first inlet of the turbine, and the second inlet of the turbine.

In yet another embodiment, the first portion of the plurality of cylinders includes a first cylinder connected to a first exhaust manifold that is connected to the exhaust gas recirculation system, the second portion of the plurality of cylinders includes second and third cylinders commonly connected to a second exhaust manifold that is connected to the first inlet of the turbine, and the third portion of the plurality of cylinders includes a fourth cylinder that is connected to a third exhaust manifold that is connected to the second inlet of then turbine. In one refinement of this embodiment, during operation of the engine the plurality of cylinders fire in order from the first cylinder, to the third cylinder, to the fourth cylinder, and then to second cylinder so that the second and third cylinders commonly connected to the second exhaust manifold and the first inlet do not fire consecutively. In a further refinement, the turbine includes a housing defining a first flow passage extending from the first inlet to a turbine wheel in the housing and a second flow passage fluidly isolated from the first flow passage that extends from the second inlet to the turbine wheel. In yet a further refinement, the first flow passage and the second flow passage define asymmetric cross-sections with the first flow passage being larger than the second flow passage.

In another embodiment, the turbine includes a housing defining a first flow passage extending from the first inlet to a turbine wheel in the housing and a second flow passage fluidly isolated from the first flow passage that extends from the second inlet to the turbine wheel. In one refinement, the first flow passage and the second flow passage define asymmetric cross-sections with the first flow passage being larger than the second flow passage.

According to another aspect, a system includes an engine with a plurality of cylinders, an intake system configured to direct a charge flow to all of the plurality of cylinders, and an exhaust system including a turbocharger having a first inlet configured to receive a first exhaust flow from a first portion of the plurality of cylinders and a second inlet configured to receive a second exhaust flow from a second portion of the plurality of cylinders. The first exhaust flow and the second exhaust flow are isolated from one another to the first and second inlets of the turbine. The system also includes an exhaust gas recirculation system configured to receive a third exhaust flow from a third portion of the plurality of cylinders and direct the third exhaust flow to the intake system.

In one embodiment, the third portion of the plurality of cylinders is exclusively dedicated to providing the third exhaust flow to the intake system. In one refinement, the first portion of the plurality of cylinders is exclusively dedicated to providing the first exhaust flow to the first inlet of the turbocharger and the second portion of the plurality of cylinders is exclusively dedicated to providing the second exhaust flow to the second inlet of the turbocharger.

In another embodiment, the turbocharger includes a turbine in the exhaust system. The turbine includes a housing defining the first inlet and the second inlet. The turbocharger further includes a compressor in the intake system connected to the turbine. The exhaust gas recirculation system is connected to the intake system downstream of the compressor.

In yet another embodiment, the first portion, the second portion and the third portion of the plurality of cylinders each comprise no more than two cylinders. In another embodiment, the first portion of the plurality of cylinders is connected to a first exhaust manifold, the second portion of the plurality of cylinders is connected to a second exhaust manifold, and the third portion of the plurality of cylinders is connected to a third exhaust manifold. In yet a further embodiment, during operation of the engine, the plurality of cylinders define a firing order and none of the first portion, the second or the third portion of the plurality of cylinders includes two consecutive cylinders in the firing order.

According to another aspect, a method includes operating an engine having a plurality of cylinders; directing a charge flow into the plurality of cylinders from an intake system; combusting a mixture of the charge flow and fuel within the plurality of cylinders to generate a power output and a flow of exhaust from the plurality of cylinders; and directing a first part of the flow of exhaust to an exhaust gas recirculation system to mix with the charge flow in the intake system prior to combustion. The first part of the flow of exhaust is created by combustion in a first portion of the plurality of cylinders. The method also includes directing a second part of the flow of exhaust to a first inlet of a turbine in an exhaust system where the second part of the flow of exhaust is created by combustion in a second portion of the plurality of cylinders. The method further includes directing a third part of the flow of exhaust to a second inlet of the turbine in the exhaust system where the third part of the flow of exhaust is created by combustion in a third portion of the plurality of cylinders. In one embodiment, the first, second and third portions of the plurality of cylinders each comprise different cylinders.

In one embodiment of the method, a compressor in the intake system is connected to the turbine, and the first part of the exhaust flow is received in the intake system downstream of the compressor. In another embodiment, each of the first portion and the second portion of the plurality of cylinders includes no more than two cylinders, and the third portion of the plurality of cylinders includes two cylinders. In yet another embodiment, the method includes the plurality of cylinders in a firing order so that cylinders comprising respective ones of the first portion, the second portion and the third portion do not fire consecutively.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine including a plurality of cylinders operable to produce an exhaust flow, an exhaust system connected to the plurality of cylinders, an intake system connected to the plurality of cylinders, and a turbocharger, the turbocharger including a turbine in the exhaust system and a compressor in the intake system connected to the turbine, wherein a first portion of the plurality of cylinders is operably connected to an exhaust gas recirculation system connected to the intake system for recirculation of a first portion of the exhaust flow, a second portion of the plurality of cylinders is operably connected to a first inlet to the turbine to provide a second portion of the exhaust flow to the turbine through the first inlet, and a third portion of the cylinders is operably connected to a second inlet to the turbine to provide a third portion of the exhaust flow to the turbine through the second inlet, wherein the first portion of the plurality of cylinders consists of one cylinder connected to a first exhaust manifold that provides the first portion of the exhaust flow to the exhaust gas recirculation system, wherein:
each of the cylinders in the second portion of the plurality of cylinders is commonly connected to a second exhaust manifold that provides the second portion of the exhaust flow to the first inlet of the turbine;
each of the cylinders of the third portion of the plurality of cylinders is commonly connected to a third exhaust manifold that provides the third portion of the exhaust flow to the second inlet of the turbine; and
at least a part of the first portion of the exhaust flow is directed to the second exhaust manifold through a control valve operable to vary a fraction of the recirculated exhaust gas from the first portion of the plurality of cylinders.

2. The system of claim 1, wherein the exhaust gas recirculation system is connected to the intake system downstream of the compressor.

3. The system of claim 1, wherein:
the plurality of cylinders define a firing order during operation of the internal combustion engine in which commonly connected cylinders do not fire consecutively.

4. The system of claim 1, wherein during operation of the engine the plurality of cylinders define a firing order and no two consecutive cylinders in the firing order are commonly connected to any of the exhaust gas recirculation system, the first inlet of the turbine, and the second inlet of the turbine.

5. The system of claim 1, wherein the turbine includes a housing defining a first flow passage extending from the first inlet to a turbine wheel in the housing and a second flow passage fluidly isolated from the first flow passage that extends from the second inlet to the turbine wheel.

6. The system of claim 5, wherein the first flow passage and the second flow passage define asymmetric cross-sections with the first flow passage being larger than the second flow passage.

7. A system, comprising:
an internal combustion engine including a plurality of cylinders operable to produce an exhaust flow, an exhaust system connected to the plurality of cylinders, an intake system connected to the plurality of cylinders, and a turbocharger, the turbocharger including a turbine in the exhaust system and a compressor in the intake system connected to the turbine, wherein a first portion of the plurality of cylinders is operably connected to an exhaust gas recirculation system connected to the intake system for recirculation of a first portion of the exhaust flow, a second portion of the plurality of cylinders is operably connected to a first inlet to the turbine to provide a second portion of the exhaust flow to the turbine through the first inlet, and a third portion of the cylinders is operably connected to a second inlet to the turbine to provide a third portion of the exhaust flow to the turbine through the second inlet, wherein:
the first portion of the plurality of cylinders includes a first cylinder connected to a first exhaust manifold that is connected to the exhaust gas recirculation system;
the second portion of the plurality of cylinders includes second and third cylinders commonly connected to a second exhaust manifold that is connected to the first inlet of the turbine; and
the third portion of the plurality of cylinders includes a fourth cylinder that is connected to a third exhaust manifold that is connected to the second inlet of the turbine, wherein at least a part of the first portion of the exhaust flow is directed to the second exhaust manifold through a control valve operable to vary a fraction of the recirculated exhaust gas from first portion of the plurality of cylinders.

8. The system of claim 7, wherein during operation of the engine the plurality of cylinders fire in order from the first cylinder, to the third cylinder, to the fourth cylinder, and then to second cylinder so that the second and third cylinders commonly connected to the second exhaust manifold and the first inlet do not fire consecutively.

9. The system of claim 8, wherein the turbine includes a housing defining a first flow passage extending from the first inlet to a turbine wheel in the housing and a second flow passage fluidly isolated from the first flow passage that extends from the second inlet to the turbine wheel.

10. The system of claim 9, wherein the first flow passage and the second flow passage define asymmetric cross-sections with the first flow passage being larger than the second flow passage.

11. A system, comprising:
an engine including a plurality of cylinders;
an intake system configured to direct a charge flow to all of the plurality of cylinders;
an exhaust system including a turbocharger having, a first inlet configured to receive a first exhaust flow from a first portion of the plurality of cylinders connected to a first exhaust manifold and a second inlet configured to receive a second exhaust flow from a second portion of the plurality of cylinders connected to a second exhaust manifold, wherein the first exhaust flow and the second exhaust flow are isolated from one another to the first and second inlets of the turbine; and
an exhaust gas recirculation system configured to receive a third exhaust flow from a third portion of the plurality of cylinders and direct the third exhaust flow to the intake system, wherein the third portion of the plurality of cylinders consists of one cylinder connected to a third exhaust manifold that provides the third exhaust flow to the exhaust gas recirculation system, wherein at least a part of the third exhaust flow is directed to the second exhaust manifold through a control valve operable to vary a fraction of the recirculated exhaust as from third portion of the plurality of cylinders.

12. The system of claim 11, wherein the first portion of the plurality of cylinders is exclusively dedicated to providing the first exhaust flow to the first inlet of the turbocharger and the second portion of the plurality of cylinders is exclusively dedicated to providing the second exhaust flow to the second inlet of the turbocharger.

13. The system of claim 11, wherein the turbocharger includes a turbine in the exhaust system, the turbine including a housing defining the first inlet and the second inlet, and the turbocharger further includes a compressor in the intake system connected to the turbine, wherein the exhaust gas recirculation system is connected to the intake system downstream of the compressor.

14. The system of claim 11, wherein the first portion of the plurality of cylinders comprises no more than two cylinders and the third portion of the plurality of cylinders comprises no more than one cylinder.

15. The system of claim 11, wherein during operation of the engine the plurality of cylinders define a firing order and none of the first portion, the second portion, or the third portion of the plurality of cylinders includes two consecutive cylinders in the firing order.

\* \* \* \* \*